United States Patent
Bevirt et al.

(10) Patent No.: US 10,035,587 B2
(45) Date of Patent: Jul. 31, 2018

(54) AERODYNAMICALLY EFFICIENT LIGHTWEIGHT VERTICAL TAKE-OFF AND LANDING AIRCRAFT WITH MULTI-CONFIGURATION WING TIP MOUNTED ROTORS

(71) Applicant: JOBY AVIATION, INC., Santa Cruz, CA (US)

(72) Inventors: Joeben Bevirt, Santa Cruz, CA (US); Edward Stilson, Santa Cruz, CA (US); Alex Stoll, Santa Cruz, CA (US); Pranay Sinha, Patna (IN)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 15/351,463

(22) Filed: Nov. 15, 2016

(65) Prior Publication Data

US 2017/0290214 A1    Oct. 5, 2017

Related U.S. Application Data

(63) Continuation of application No. 13/951,450, filed on Jul. 25, 2013, now Pat. No. 9,527,581.

(51) Int. Cl.
| | |
|---|---|
| *B64C 23/00* | (2006.01) |
| *B64C 23/06* | (2006.01) |
| *B64C 29/00* | (2006.01) |
| *B64D 27/24* | (2006.01) |
| *B64D 27/02* | (2006.01) |

(52) U.S. Cl.
CPC ........ *B64C 23/065* (2013.01); *B64C 29/0025* (2013.01); *B64C 29/0033* (2013.01); *B64D 27/24* (2013.01); *B64D 2027/026* (2013.01); *Y02T 50/164* (2013.01); *Y02T 50/44* (2013.01); *Y02T 50/62* (2013.01)

(58) Field of Classification Search
CPC ............ B64C 27/26; B64C 2700/6291; B64C 29/0008; B64C 29/0016; B64C 29/0025; B64C 29/0033
See application file for complete search history.

(56) References Cited

U.S. PATENT DOCUMENTS

| | | | | |
|---|---|---|---|---|
| 3,592,412 A | * | 7/1971 | Glatfelter | ............ B64C 29/0033 244/7 A |
| 5,141,176 A | * | 8/1992 | Kress | ................... B64C 29/0033 244/48 |
| 5,405,105 A | * | 4/1995 | Kress | ................... B64C 29/0033 244/12.4 |
| 5,823,468 A | * | 10/1998 | Bothe | ....................... B64B 1/08 244/12.3 |
| 6,719,244 B1 | * | 4/2004 | Gress | ................... B64C 29/0033 244/17.25 |
| 8,376,264 B1 | * | 2/2013 | Hong | ..................... B64C 27/26 244/17.23 |

(Continued)

*Primary Examiner* — Tien Q Dinh
*Assistant Examiner* — Aaron M Rodziwicz
(74) *Attorney, Agent, or Firm* — Michael A. Guth

(57) ABSTRACT

An aerial vehicle adapted for vertical takeoff and landing using a set of wing tip mounted thrust producing elements for takeoff and landing. An aerial vehicle which is adapted to vertical takeoff with the wings in a horizontal flight attitude then transitions to a horizontal flight path. An aerial vehicle which uses different configurations of its wing tip mounted, VTOL enabling rotors to reduce drag in all flight modes.

4 Claims, 13 Drawing Sheets

(56) References Cited

U.S. PATENT DOCUMENTS

| | | | |
|---|---|---|---|
| 2011/0042508 A1* | 2/2011 | Bevirt | B64C 15/00 244/12.4 |
| 2011/0042509 A1* | 2/2011 | Bevirt | B64C 29/0033 244/12.4 |
| 2011/0315809 A1* | 12/2011 | Oliver | B64C 29/0033 244/12.4 |
| 2012/0234968 A1* | 9/2012 | Smith | B64C 29/0033 244/12.3 |

* cited by examiner

AERODYNAMICALLY EFFICIENT LIGHTWEIGHT VERTICAL TAKE-OFF AND LANDING AIRCRAFT WITH MULTI-CONFIGURATION WING TIP MOUNTED ROTORS

CROSS-REFERENCE TO RELATED APPLICATIONS

This application is a continuation of U.S. patent application Ser. No. 13/951,450 to Bevirt et al., filed Jul. 25, 2013, which is hereby incorporated by reference in its entirety.

BACKGROUND

Field of the Invention

This invention relates to powered flight, and more specifically to a vertical take-off and landing aircraft with multi-configuration wing tip mounted rotors.

Description of Related Art

There are generally three types of vertical takeoff and landing (VTOL) configurations: wing type configurations having a fuselage with rotatable wings and engines or fixed wings with vectored thrust engines for vertical and horizontal translational flight; helicopter type configuration having a fuselage with a rotor mounted above which provides lift and thrust; and ducted type configurations having a fuselage with a ducted rotor system which provides translational flight as well as vertical takeoff and landing capabilities.

In order to provide efficiency in both vertical take-off and forward flight modes, improvements to past systems must be made. What is called for is a vertical take-off and landing aircraft that incorporates efficiencies into all use modes.

SUMMARY

An aerial vehicle adapted for vertical takeoff and landing using a set of wing tip mounted thrust producing elements for takeoff and landing. An aerial vehicle which is adapted to vertical takeoff with the wings in a horizontal flight attitude that then transitions to a horizontal flight path. An aerial vehicle which uses different configurations of its wing tip mounted, VTOL enabling rotors to reduce drag in all flight modes.

DETAILED DESCRIPTION

Although vertical takeoff and landing (VTOL) aircraft have always been desired, compromises in the realization of these aircraft have limited their usefulness and adoption to certain niches. Notably, helicopters are relatively loud, slow, short-ranged, and expensive to operate. The present invention is capitalizing on advances in electric motors, battery technology, and control systems to create revolutionary VTOL aircraft that are quiet, safe, and efficient.

Figure 1:
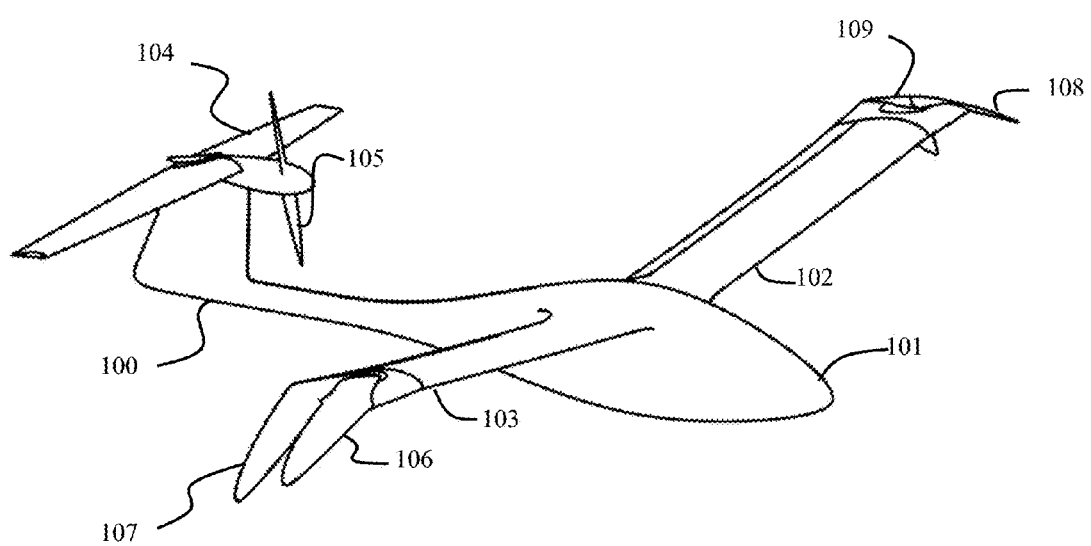
FIG. 1 is a perspective view of an aerial vehicle in forward flight according to some embodiments of the present invention.
Figure 2:
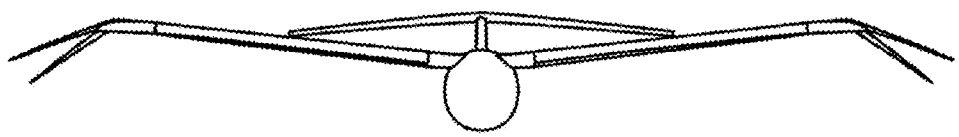
FIG. 2 is a front view of an aerial vehicle in a forward flight configuration according to some embodiments of the present invention.

In some embodiments of the present invention, as seen in FIGS. 1 and 2, an aerial vehicle 100 is seen in forward flight configuration. The aircraft body 101 supports a left wing 102 and a right wing 103. The aircraft body 101 extends rearward is also attached to raised horizontal stabilizer 104 which may be attached to a vertical stabilizer with a rotational coupling. The horizontal stabilizer has a rear motor 105 attached thereto.

The right wing 103 has wing tip features 106, 107 adapted to provide lift and reduce drag. The left wing 102 has wing tip features 108, 109 also adapted to provide lift and reduce drag. In a typical forward flight operating scenario, the aerial vehicle 100 may fly as a traditional airplane, although powered by a rear mounted motor and propeller 105.

Figure 3:
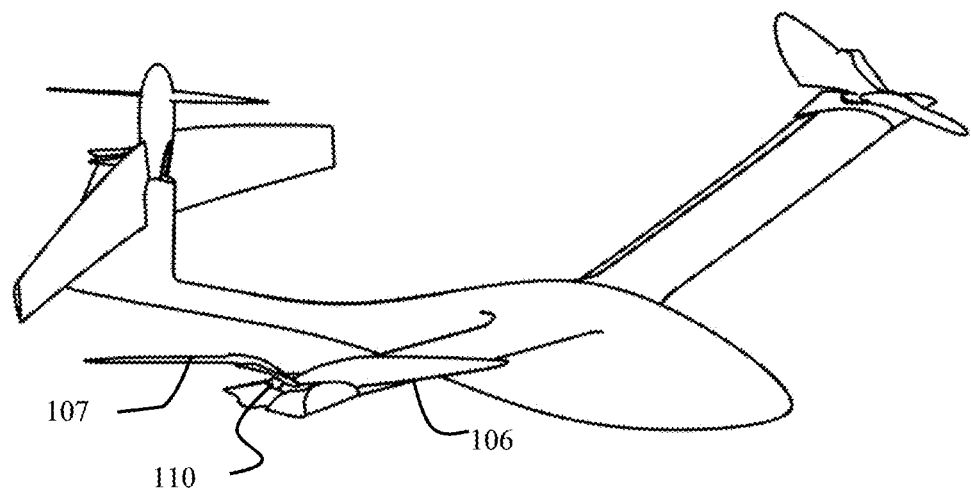
FIG. 3 is a perspective view of an aerial vehicle in takeoff configuration according to some embodiments of the present invention.
Figure 4:
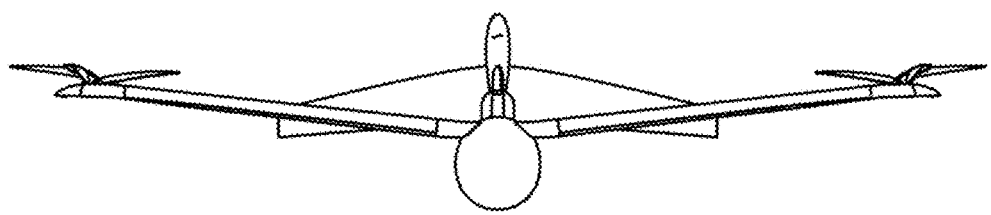
FIG. 4 is a front view of an aerial vehicle in takeoff configuration according to some embodiments of the present invention.
Figure 5:
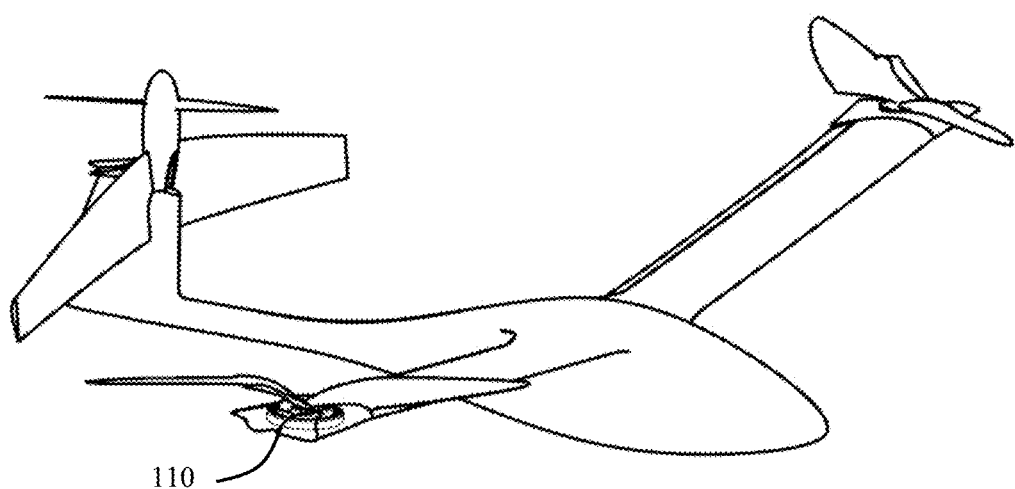
FIG. 5 is a perspective view of an aerial vehicle in takeoff configuration with some cowlings removed for viewing, according to some embodiments of the present invention.

FIGS. 3 and 4 illustrate a perspective view and a front view, respectively, of the aerial vehicle 100 in a takeoff (or landing) configuration. In this configuration, using the right wing 103 as an example, the wing tip features 106, 107 have been reconfigured relative to each other, and relative to the right wing 103. In this reconfigured configuration, the wing tip features 106, 107 are able to operate as a vertically oriented propeller, powered by an electric motor 110 mounted within the right wing 103. The raised rear elevator 104 is seen in FIGS. 3 and 4 in a takeoff configuration where the rear elevator has rotated relative to the vertical stabilizer, and to the aircraft body 101, to allow the rear motor 105 to provide a predominantly vertical thrust. The aircraft's center of gravity is located between the wing and the tail, so when tilted upwards, this propeller of the rear motor 105 provides adequate pitch control in both directions in vertical flight via differential RPM control of the tail propeller and the wingtip rotors. This propeller tilts forward during transition and is the sole propulsion source in horizontal flight. The horizontal tail, placed in a T-tail configuration, tilts with the propeller to reduce download on the surface and provide additional control by always locating the elevator in the propwash. Placing this propeller on the tail instead of on the nose provides the benefit of reduced scrubbing drag in horizontal flight. The vertical tail is swept such that the leading edge is vertical to maximize propeller clearance.

In steady vertical flight, the three rotors are nominally run at a low tip speed of 350 feet/second to significantly reduce noise during takeoff and landing. Custom electric motor designs eliminate the need for gearboxes, reducing weight and noise and improving reliability. An active control system stabilizes the aircraft in vertical and transitional flight, reducing pilot workload and simplifying control. Conventional takeoffs and landings are possible in the horizontal flight configuration.

Figure 6:
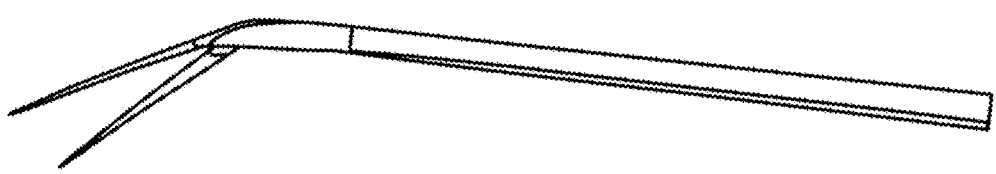
FIG. 6 is a front view of the wing and wing tip of an aerial vehicle in forward flight configuration according to some embodiments of the present invention.
Figure 7:
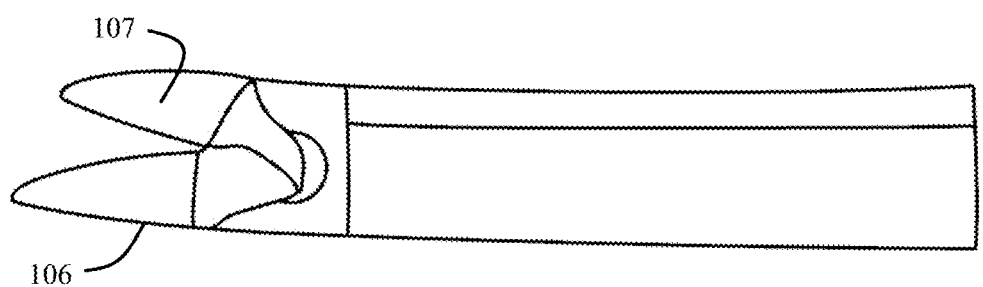
FIG. 7 is a top view of the wing and wing tip of an aerial vehicle in forward flight configuration according to some embodiments of the present invention.
Figure 8:
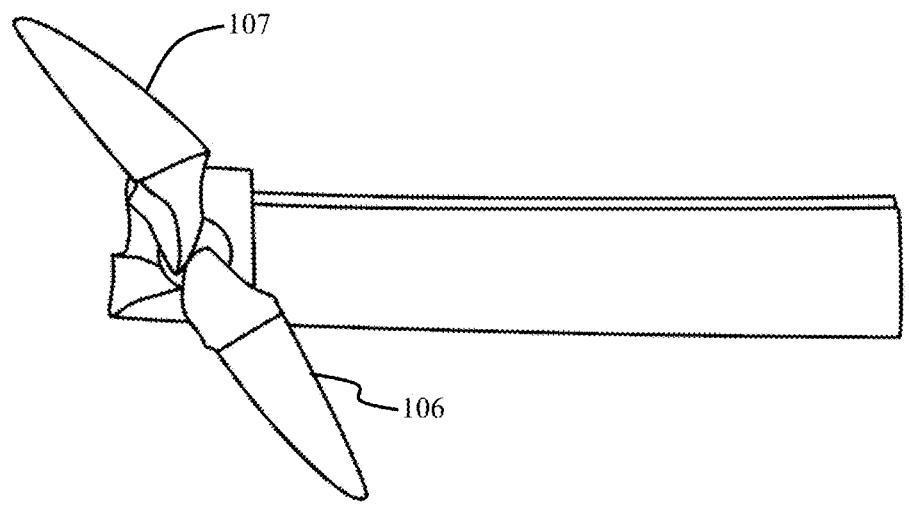
FIG. 8 is a top view of the wing and wing tip of an aerial vehicle in takeoff configuration according to some embodiments of the present invention.
Figure 9:
FIG. 9 is a front view of the wing and wing tip of an aerial vehicle in takeoff configuration according to some embodiments of the present invention.

Of note is the design of the wing tip features and their use in a forward flight configuration, as seen in FIGS. 6 and 7, and their use in a takeoff configuration, as seen in FIGS. 8 and 9. A two-bladed variation has been designed in which both blades pivot to become two separate tandem wingtips in horizontal flight. Employing two blades improves rotor efficiency and reduces cyclic loading. This geometry results in the airflow arriving from the leading edges of the blades in both vertical and horizontal flight, requiring fewer design compromises, and better efficiency in all flight modes. The two blades balance the propeller, precluding the need for a counterweight.

Figure 10:
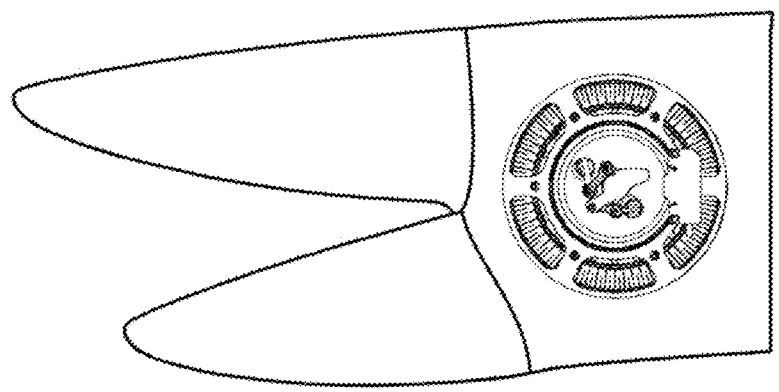
FIG. 10 is view of the wing tip rotor of an aerial vehicle according to some embodiments of the present invention.
Figure 11:
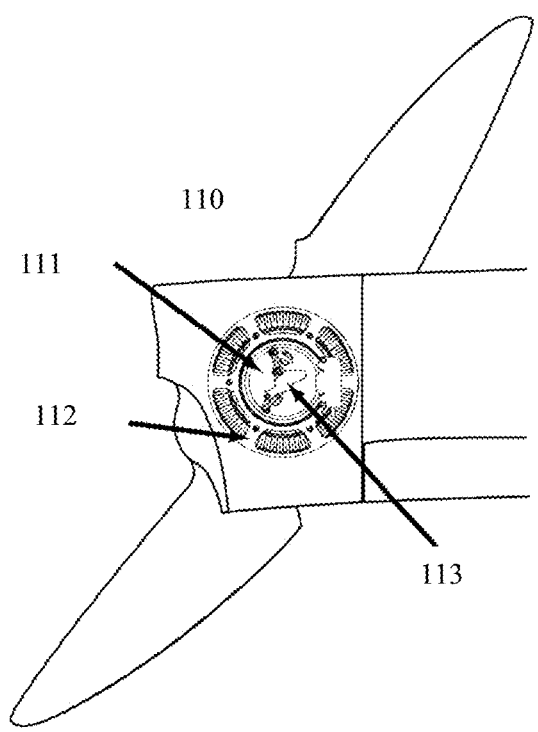
FIG. 11 is a view of the wing tip rotor and blade linkages of an aerial vehicle according to some embodiments of the present invention.

As seen in FIGS. 10 and 11, a brushless electric motor is located in each wingtip. The stator is fixed to or within the wing, and the blades are rigidly attached to the rotor, without flapping, lead/lag, or feathering hinges. In vertical flight, the blades are locked 180 degrees away from each other to form a conventional two-bladed rotor, and in horizontal flight, the blades are repositioned to act as two discrete tandem wingtips. Dihedral in the wing provides adequate clearance between the wing and the blades in vertical flight. Roll control in vertical flight is provided by differential RPM control of the two wingtip motors.

Figure 12:
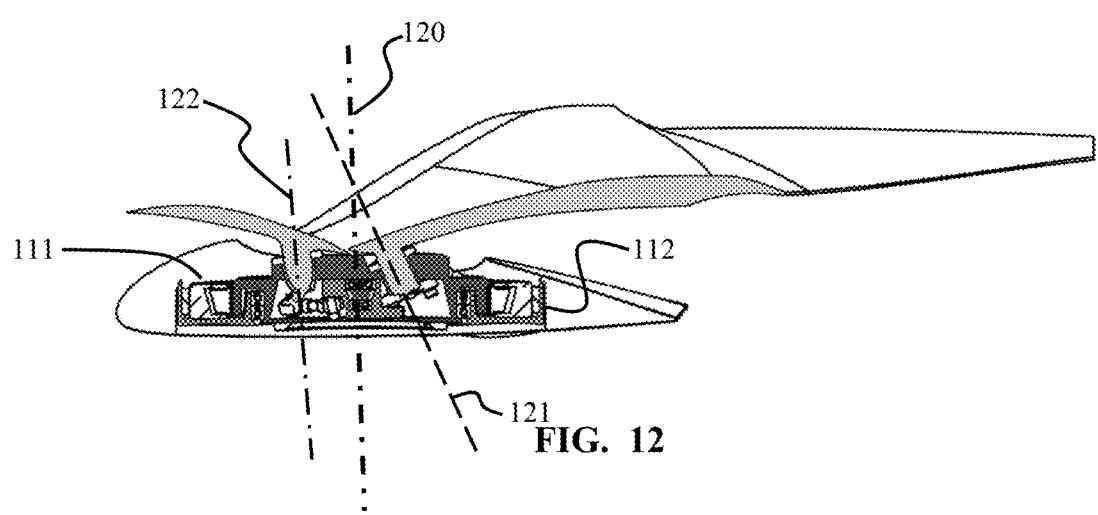
FIG. 12 is a partial internal view of the wing tip rotor and blade linkages of an aerial vehicle according to some embodiments of the present invention.

FIG. 12 illustrates an aspect of the multi-configuration tip rotors according to some embodiments of the present invention. An electric motor 110 embedded in wing, such as right wing 103, would have its stator 112 embedded into, or otherwise affixed to, the wing structure. The rotor 111 of the motor 110 is adapted to rotate within the stator 112 around a motor rotation axis 120. The wing tip features 106, 107 which also become blades as a propeller for the motor in the takeoff configuration, deploy from their individual first locations relative to each other, and to the rotor, to their individual second locations relative to each other, and to the rotor. Within the rotor 111, each tip rotor may be able to rotate around its own deployment axis 121, 122. As each tip rotor rotates around its deployment axis to its individual deployed position, the tip rotors seen as vortex shedding wing tip features rotate, and reconfigure, to the deployed position of a two bladed propeller. Again, the tip rotors as propeller blades use a configured position well adapted for propeller flight, and the tip rotors as wing tip features use a position well adapted for low drag and vortex shedding. In both configurations, the leading edges into the apparent wind are the designed leading edges of the tip rotors.

The transition of the wing tips to rotor blades may include the following sequence: 1) A solenoid releases, unlocking the blades. This solenoid holds the blades in position during cruise. 2) The rotor (B) rotates 80 degrees; during this rotation, linkages rotate the blades away from each other into diametrically-opposed positions. 3) A second solenoid releases the linkage plate inside the rotor, and the blades are now held in position fixed relative to each other by a spring. In this configuration, rotation of the rotor causes both blades to rotate in the same direction.

Figure 13A:
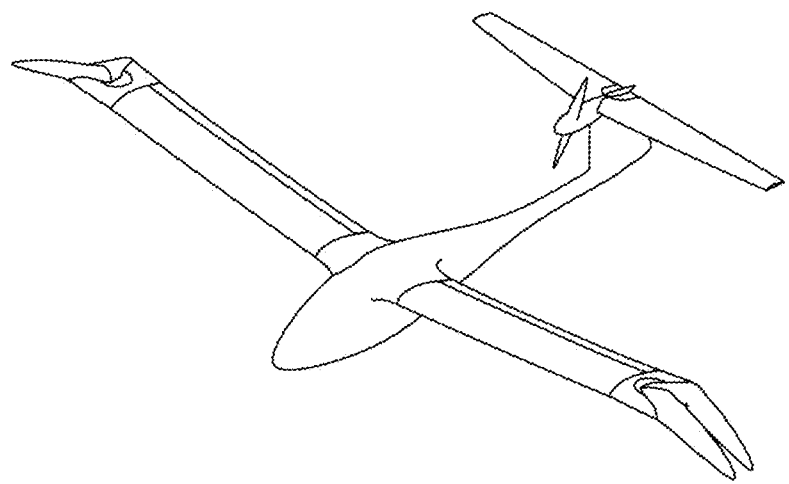
FIGS. 13A-D illustrate the deployment of the tip rotors from a stowed to a deployed position.
Figure 13B:
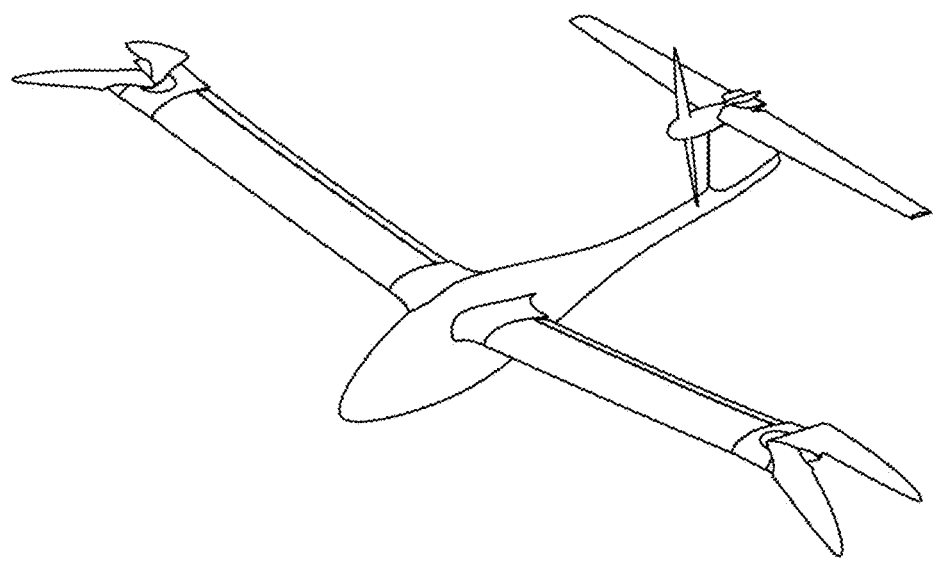
Figure 13C:
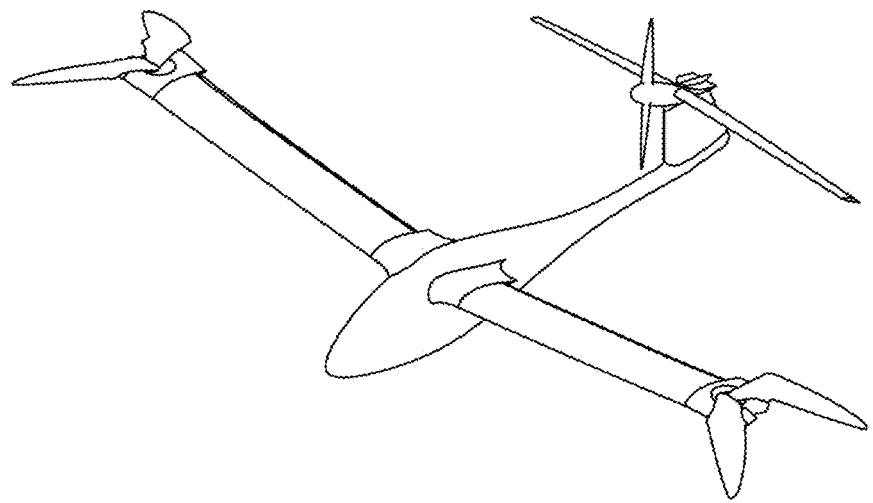
Figure 13D:
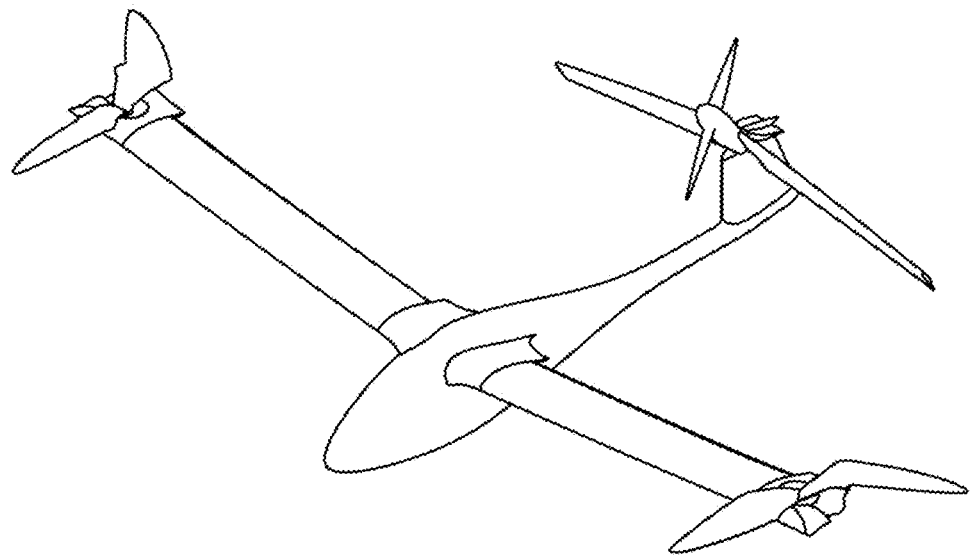
Figure 17:
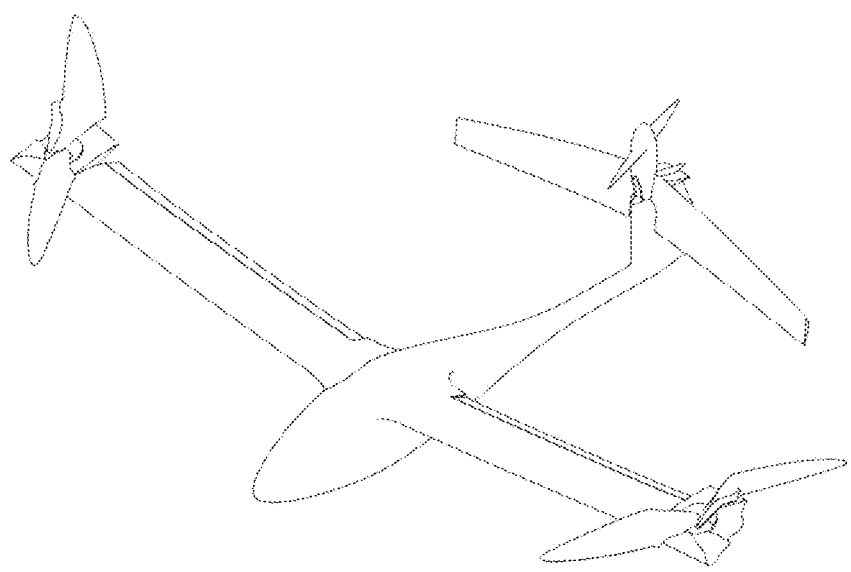
FIG. 17 illustrates pitch rotation of the wing tip rotors according to some embodiments of the present invention.

FIG. 13A-D illustrate the transition of the tip rotors from a forward flight configuration as tandem wing tips to a takeoff position as motor driven propellers. As seen, the tip rotors are configured as tandem wing tips in the forward flight configuration of FIG. 13A. The tip rotors transition to a takeoff configuration, until that configuration is reached, as seen in FIG. 13D. In some embodiments, the wing tip rotors are attached to the wings with a controllable rotary mechanism such that the rotors may be adjusted in pitch while in use during takeoff and landing. In some aspects, the rotation of the wing tip rotors in the pitch axis will facilitate transition from vertical to horizontal flight modes. FIG. 17 illustrates the tip rotors in a pitched position.

Design and Analysis: Initial configuration designs were performed using a purpose-written configuration analysis code. This code allowed the parametric definition of a configuration and mission; using this definition, the component masses and moments of inertia were estimated, and AVL, a vortex-lattice tool that was developed at the Massachusetts Institute of Technology, was run to estimate drag and stability of the wings and tails. Statistical methods were employed to estimate the effects on drag and static longitudinal stability of the fuselage, as well as other parasitic drag sources not properly captured by vortex-lattice analysis (interference drag and leakage and protuberance drag). The code began with a provided takeoff weight and computed the available payload mass, allowing range to be computed if a portion of this payload mass is used for fuel or batteries. Although this configuration ties the disk loading and planform geometry together in unusual and unfamiliar ways, use of this code in this way aids in the identification of important trends and tradeoffs. For example, if the wingtip blade radius is too high for a given total wing area and aspect ratio, the wing taper ratio becomes too high to be structurally efficient, resulting in a tradeoff in power requirements between cruise (through wing size and aspect ratio) and vertical flight (through disk loading).

Initial aerodynamic and acoustic design of the rotor blades was performed using a blade-element momentum design and analysis code suite employing the 2D viscous panel code XFOIL to estimate section aerodynamics, Goldstein's vortex theory to predict induced velocities, and the Ffowcs Williams-Hawkings equation to estimate acoustics. Due to increasing dynamic pressure with radius when the blades are operated as rotor blades, rotor performance is more sensitive to the design of the outer portion of the blades; conversely, due to the larger chord near the root, performance in horizontal flight, when the blades are positioned as wingtips, is more sensitive to the root design. Therefore, twist and chord in the inboard portion of the blades were chosen to improve aerodynamics in horizontal flight by imposing constraints in the rotor design code. Airfoils were chosen by 2D viscous panel code analysis of many airfoil designs, including custom designs, at the conditions encountered in both the vertical flight configuration, when the blades act as rotor blades, and the forward flight configuration, when the blades act as wingtips. Blade thickness was conservatively chosen to preclude the possibility of adverse aeroelastic effects.

Figure 15:
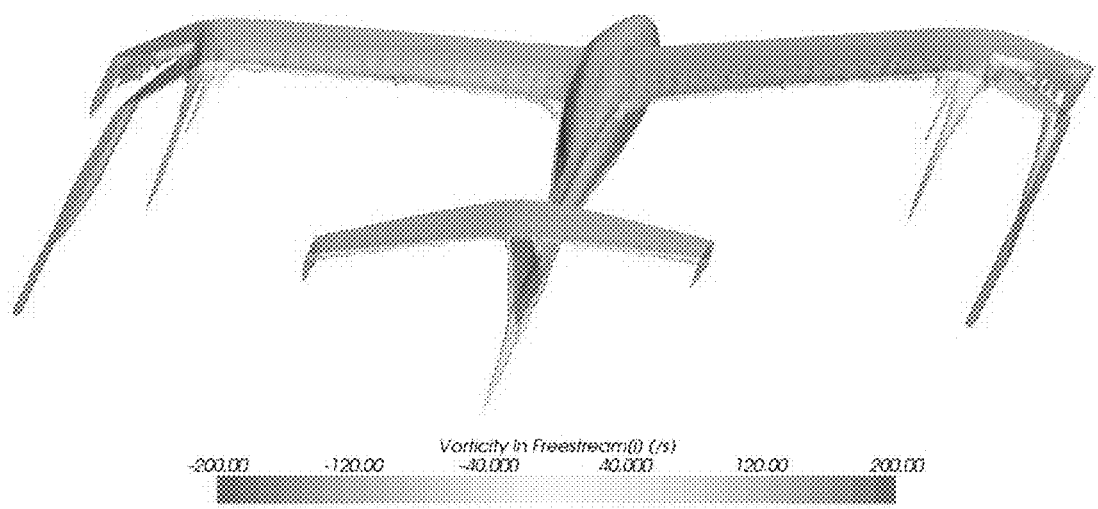
FIG. 15 illustrates data relating to vorticity magnitude for designs according to some embodiments of the present invention.

Extensive CFD analyses have been performed to further guide design of both the airframe configuration and wingtip blades. STAR-CCM+, a commercial CFD code, was used for both mesh generation and CFD solutions. Unstructured meshes were employed, and Navier-Stokes simulations were run using the SST k-ω turbulence model and the γ-Reθ transition model. These simulations were used to tune the spanwise lift distribution of the aircraft in forward flight for maximum efficiency, check stability predictions of lower-fidelity analyses, and estimate rotor efficiency and download caused by the wing. A CFD result for a 55-pound prototype at 43 knot cruise at standard sea level conditions is shown in FIG. 15, showing the complex tip vortex system that develops. Results of this configuration show a L/D in excess of 20 at this flight condition, although this is expected to be somewhat reduced in the flight vehicle due to control surface gaps, antennas, motor cooling, etc.

Figure 16A:
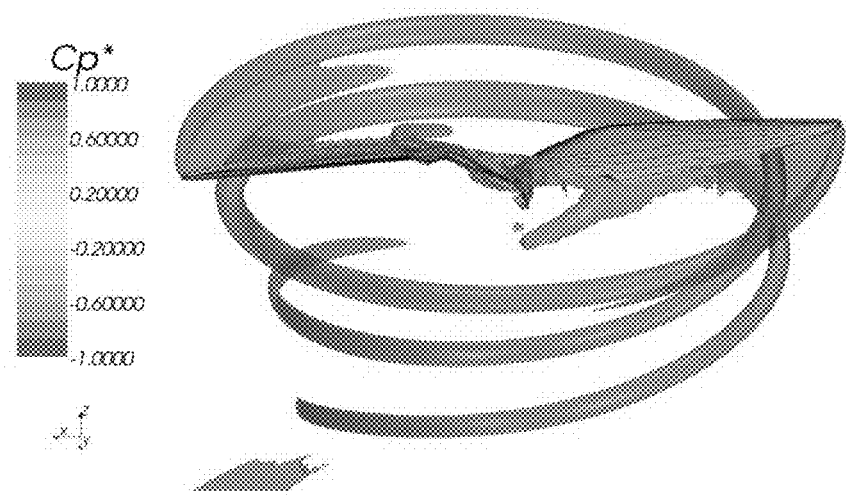
FIGS. 16A-B illustrate data relating to pressure and pressure contours for designs according to some embodiments of the present invention.
Figure 16B:
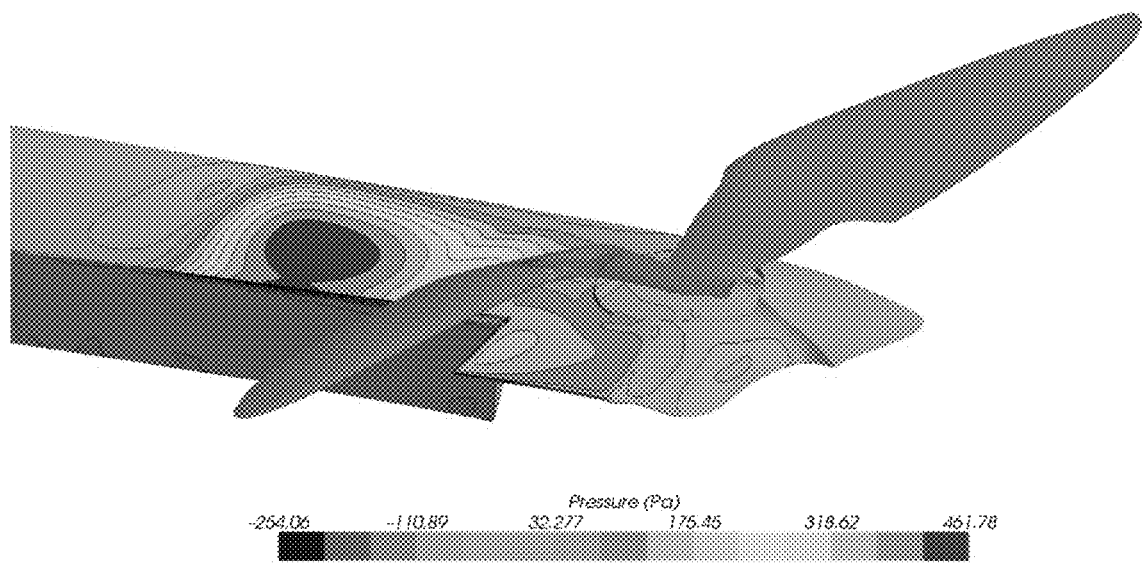

FIGS. 16A-B shows results of CFD analyses of the blade performance of a 55-pound prototype in a 100 ft/min axial climb at standard sea level conditions. Uninstalled figure of merit (computed as the ratio of ideal climb power required from momentum theory to computed power) is 72%, and the required thrust increment due to the download on the wing is 13%.

FIG. 16A illustrates uninstalled blades with isosurfaces of constant vorticity magnitude and with blades contoured by Cp* (the pressure co-efficient non-dimensionalized by the local rotational velocity). FIG. 16B illustrates The blades and the wing, with 25% chord flaps deflected to 55 degrees, showing download effects on the wing via pressure contours.

Figure 14:
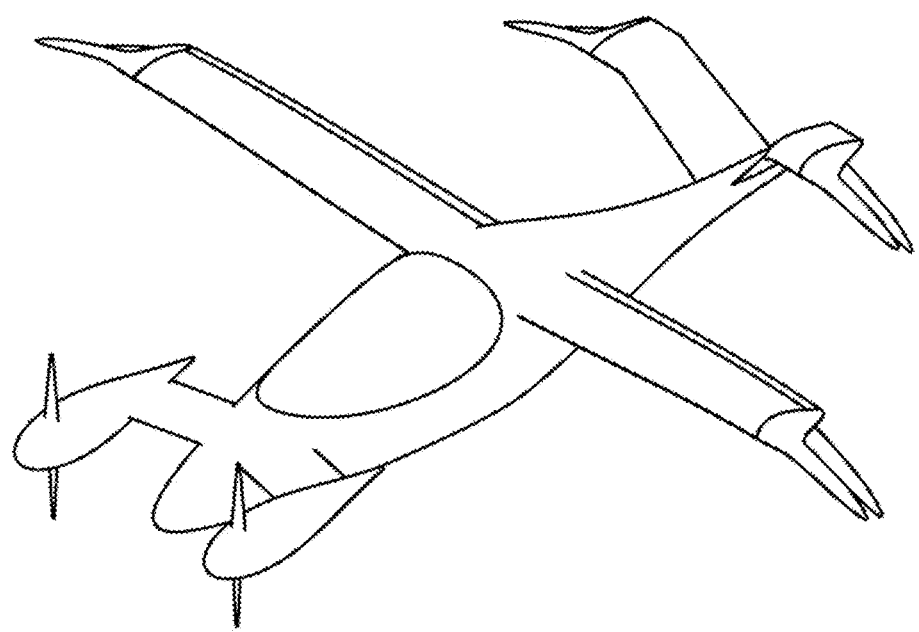
FIG. 14 illustrates an aerial vehicle with multiple wing tip rotors according to some embodiments of the present invention.

FIG. 14 illustrates another embodiment of an aerial vehicle using tip rotors on both the wings and the rear elevators.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle adapted for vertical takeoff and horizontal flight, said aerial vehicle comprising:
   an aerial vehicle body;
   three or more thrust producing elements differentially spaced relative to the thrust direction of said thrust producing elements while said vehicle body is in vertical flight;
   a flight control system, said flight control system adapted to control the attitude of said aerial vehicle while taking off vertically by varying the thrust of the three or more thrust producing elements;
   a first left wing, said first left wing comprising a first left wing tip rotor, wherein said first left wing tip rotor is one of said three or more thrust producing elements; and
   a first right wing, said first right wing comprising a first right wing tip rotor, wherein said first right wing tip rotor is one of said three or more thrust producing elements, wherein said wing tip rotors are powered by electric motors mounted at the tips of said wings, said electric motors comprising a rotor and a stator, and wherein each of said wing tip rotors comprises a first blade and a second blade, and wherein said first left wing tip rotor and said first right wing tip rotor are adapted to deploy from a forward flight configuration wherein said wing tip rotors are configured as tandem wingtips to a vertical takeoff configuration wherein said wing tip rotors are configured as a two bladed propeller, and wherein said first blade and said second blade have leading edges during vertical flight, and wherein each of said leading edges of said first blade and said second blade face forward when in said forward flight configuration, and wherein each of said electric motors rotate around its own motor rotation axis, and wherein said first blade of each wing tip rotor deploys from a forward flight configuration to a vertical takeoff configuration by rotating around a second axis within the rotor, wherein said second axis is not parallel to the motor rotation axis.

2. The aerial vehicle of claim 1 wherein said second blade deploys from a forward flight configuration to a vertical takeoff configuration by rotating around a third axis within the rotor.

3. The aerial vehicle of claim 1 further comprising:
   a vertical stabilizer attached to said vehicle body; and
   a rear motor attached to said vertical stabilizer, said motor adapted to rotate from a forward facing configuration providing rear ward thrust to a vertical facing configuration providing downward thrust, wherein said rear motor is one of said three or more thrust producing elements.

4. The aerial vehicle of claim 2 further comprising:
   a vertical stabilizer attached to said vehicle body; and
   a rear motor attached to said vertical stabilizer, said motor adapted to rotate from a forward facing configuration providing rear ward thrust to a vertical facing configuration providing downward thrust, wherein said rear motor is one of said three or more thrust producing elements.

* * * * *